No. 816,571. PATENTED APR. 3, 1906.
K. F. ELERS.
FLEXIBLE CONNECTION AND SUSPENSION MEANS FOR GEARLESS MOTORS.
APPLICATION FILED APR. 3, 1905.

3 SHEETS—SHEET 2.

WITNESSES:
C. L. Belcher
R. J. Dearborn

INVENTOR
Karl F. Elers
BY
Wesley G. Carr
ATTORNEY

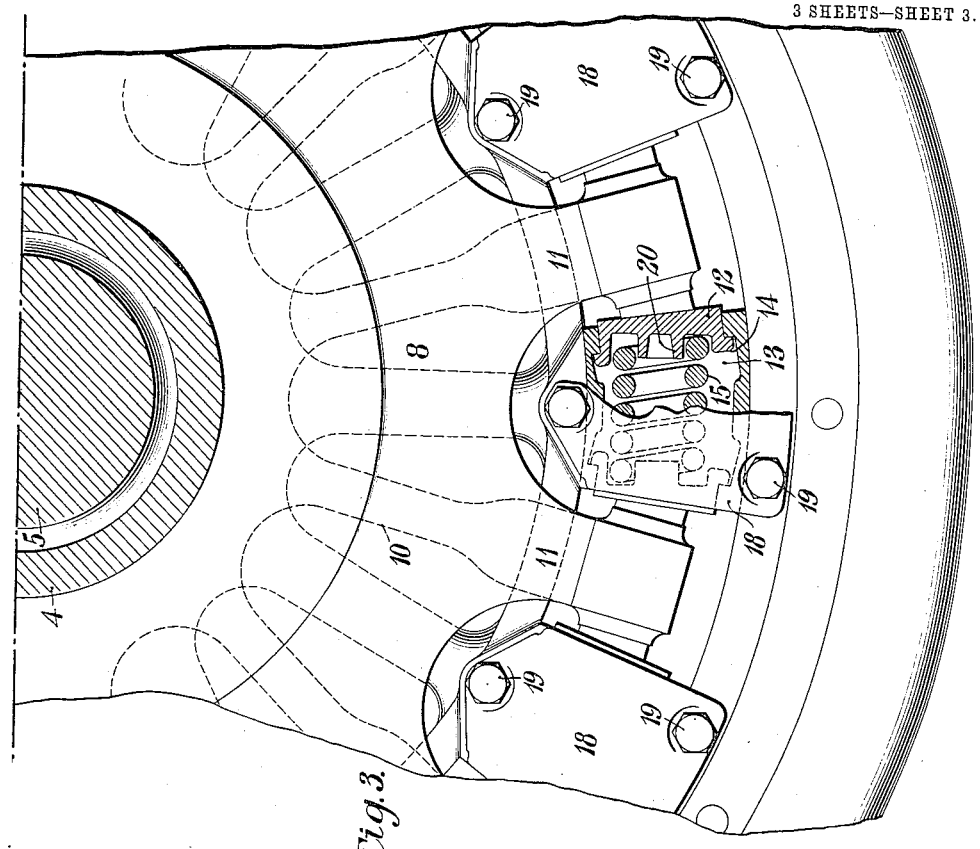
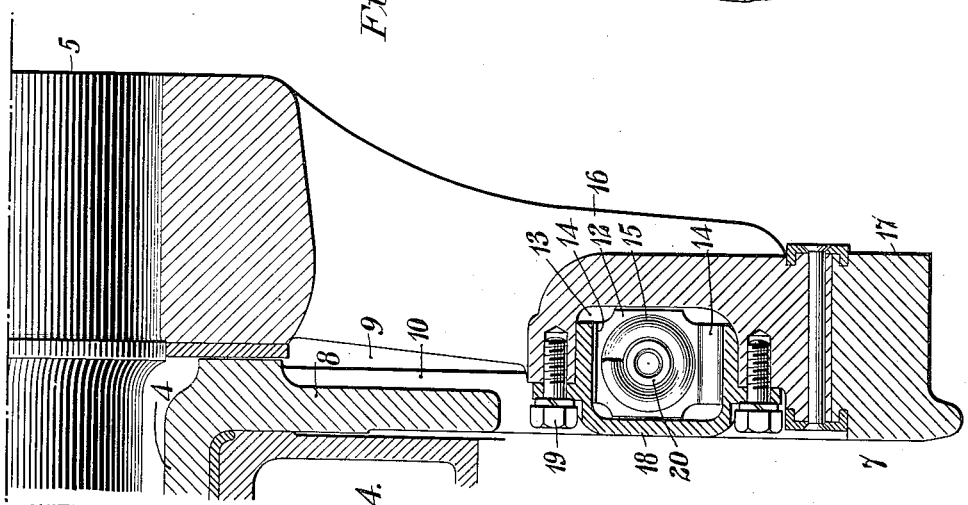

UNITED STATES PATENT OFFICE.

KARL F. ELERS, OF PITTSBURG, PENNSYLVANIA, ASSIGNOR TO WESTINGHOUSE ELECTRIC & MANUFACTURING COMPANY, A CORPORATION OF PENNSYLVANIA.

FLEXIBLE CONNECTION AND SUSPENSION MEANS FOR GEARLESS MOTORS.

No. 816,571.     Specification of Letters Patent.     Patented April 3, 1906.

Application filed April 3, 1905. Serial No. 253,693.

*To all whom it may concern:*

Be it known that I, KARL F. ELERS, a citizen of the United States, and a resident of Pittsburg, in the county of Allegheny and State of Pennsylvania, have invented a new and useful Improvement in Flexible Connections and Suspension Means for Gearless Motors, (Case No. 1,347,) of which the following is a specification.

My invention relates to electrically-propelled vehicles, and particularly to means for operatively connecting gearless motors to such vehicles.

The object of my invention is to provide resilient connections between a motor-armature that is so mounted as to be concentric with the axle of a car or locomotive truck and the car or truck wheel that is driven by the motor, such connections being so constructed and arranged as to constitute spring-supports for the armature in all of its positions and the springs constituting such supports being so combined with the motor-armature and the truck-wheel as to be at all times under compression irrespective of the direction of rotation.

Figure 1:
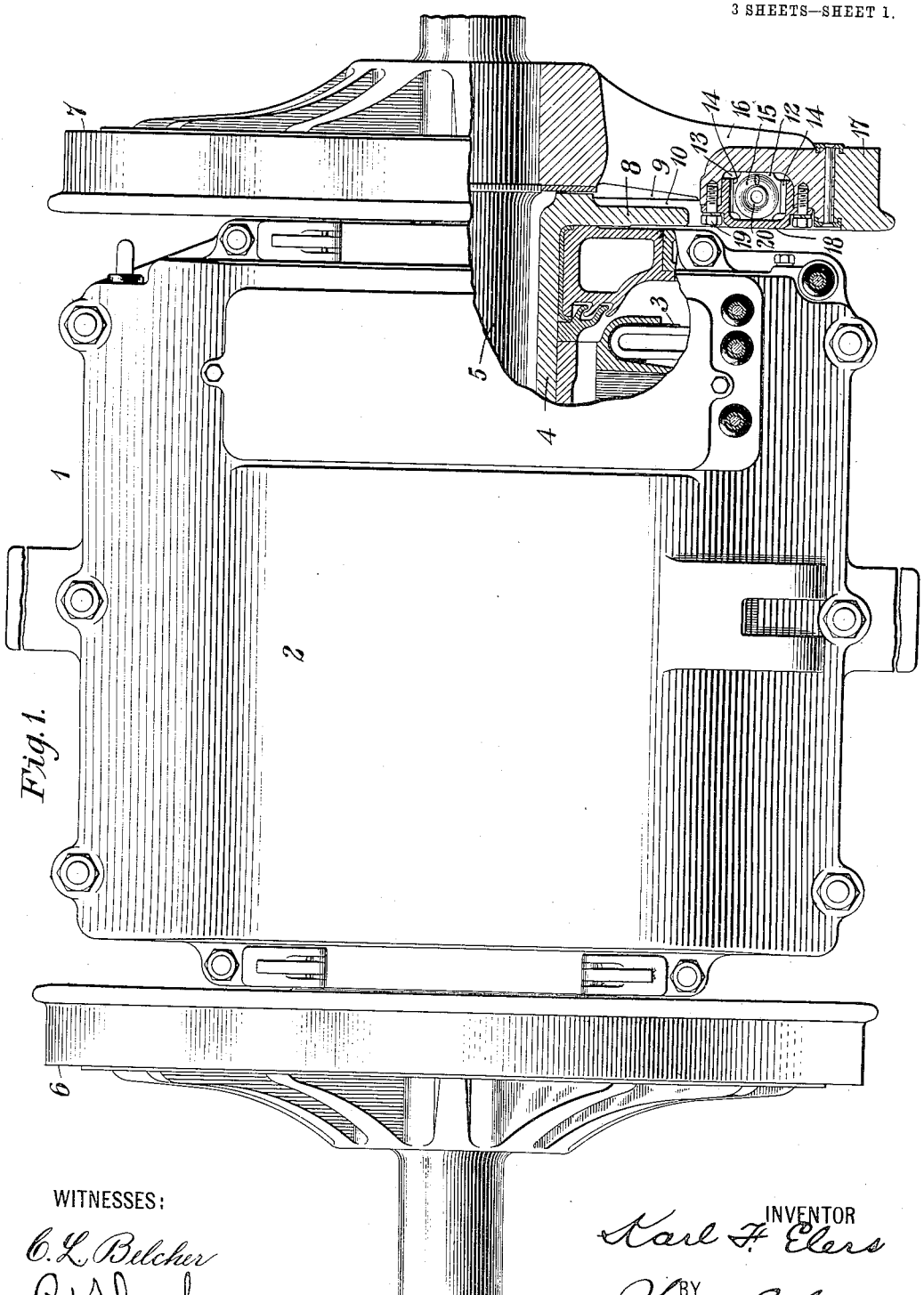
Figure 2:
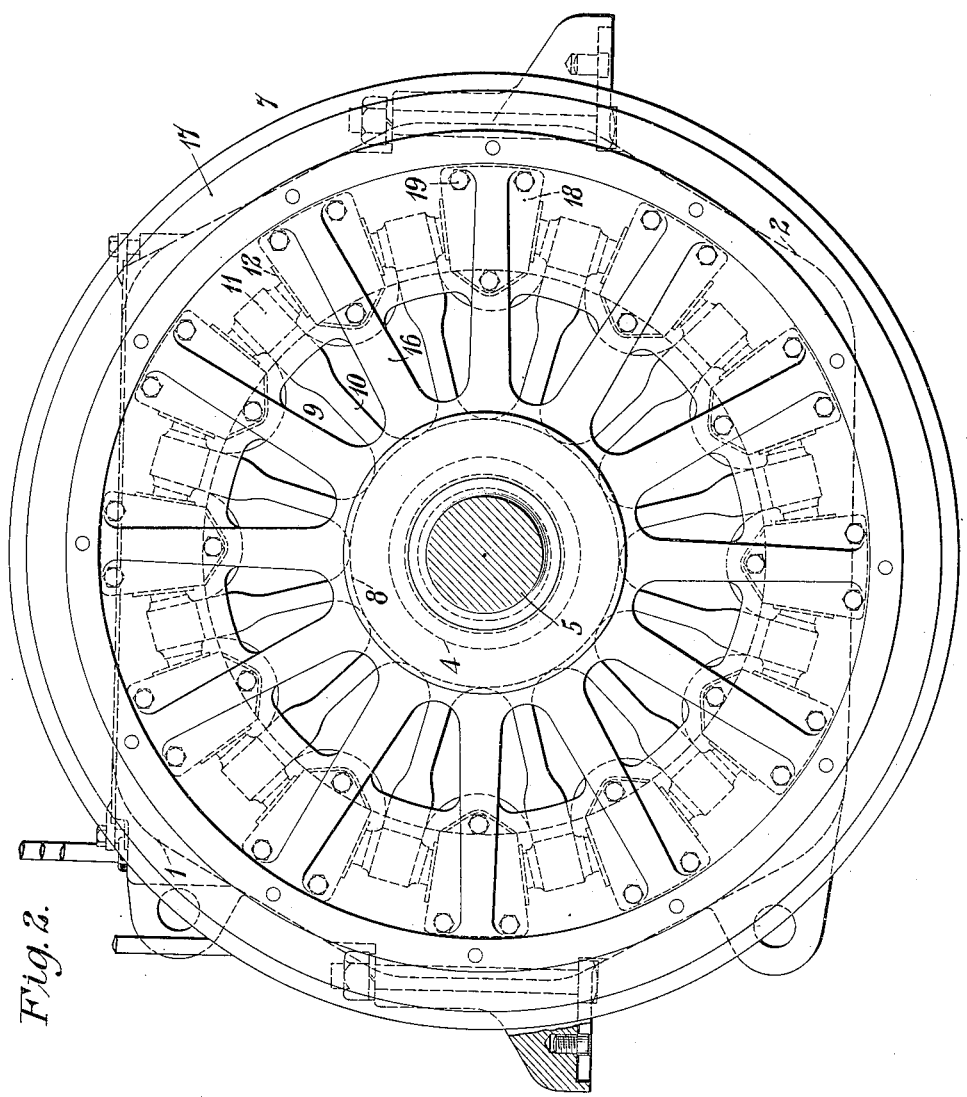

In the accompanying drawings, Figure 1 is a plan view of a pair of truck-wheels and a motor mounted upon the axle of such wheels, a portion of one of the wheels and of the motor-frame being broken away to show the internal structure. Fig. 2 is an end elevation of the truck-wheels and motor shown in Fig. 1. Fig. 3 is a detail view, partially in elevation and partially in section, of a portion of the connections between the motor-armature and the truck-wheel; and Fig. 4 is a sectional view, on an enlarged scale, of the parts shown in section, Fig. 1.

Attempts have heretofore been made to utilize electric motors for the propulsion of railway-vehicles without the interposition of speed-reducing gearing between the armatures of such motors and the truck axles or wheels driven thereby; but difficulty has generally been experienced not only in providing motors of sufficiently slow speed to economically fulfil the requirements of such service, but also in so supporting the armatures of the motors as to relieve them from the injurious strains and shocks incident to their service and at the same time preserve the proper operative relations between the relatively moving parts.

It is generally understood that the use of coil-springs under compression is more desirable than the use of such springs under tension, for the reason that there is no necessity for employing attachment devices between the ends of the springs and the adjacent parts of the mechanism that coöperate therewith, and for the further reason that the application of excessive weight or power to a coil-spring when under compression forces the adjacent turns into engagement with each other, and thus provides a solid cylinder to resist any further compression strain that may be applied.

My present invention provides a simple, effective, and durable means for utilizing coil-springs under compression in such manner as to provide a distributed cushion-support for the armature of an electric motor and to also connect the same effectively with the truck-wheel which it is desired to directly operate.

The electric motor 1, which may be utilized alone for driving a car or locomotive or which may be one of any desired number of motors for such service, comprises a field-magnet frame 2 of any suitable form and dimensions and an armature 3, which is rigidly and securely mounted upon a sleeve or quill 4, that surrounds the truck-axle 5, having wheels 6 and 7 of suitable structure and dimensions. The armature-sleeve 4 is connected to the truck-wheel 7 by means which constitute my present invention, and which I will now describe, without intention, however, of limiting the invention to the exact details shown and described, since it is conceivable that such details may be varied within considerable limits without materially changing the mode of operation or result.

The sleeve or quill 4 is provided with a laterally-projecting plate or flange 8, which is located within a corresponding recess 9 in the wheel 7 and may be provided with strengthening-ribs 10, that are continued beyond the outer edge of the plate or flange 8 as radially-projecting arms 11, the ends of which are provided with blocks 12, that project into chambers 13 in the wheel 7. The heads 12 are provided with flanges 14, which are located inside of chamber 13 and engage corresponding shoulders at the ends of the chambers to prevent any possibility of dislodgment of the heads, and interposed within each chamber 13 between the heads 12, at the opposite ends thereof, is a coil-spring 15. The chambers 13 are located substantially at the junction between spokes 16 and the rim 17 of the wheel 7 and are of course uniformly spaced circumferentially. Each chamber 13 is provided with a cover-plate 18, that is removably fastened in position by means of screw-bolts 19, and each head 12 has an inner projection 20, over which fits the corresponding end of the coil-spring 15.

It is to be understood that, by reason of the structure and arrangement of the springs 15 and the coöperating heads 12, the weight of the armature is applied to all the springs and in such manner that they are always placed under compression irrespective of the direction of rotation of the armature. It follows, therefore, that the armature of the motor is yieldingly supported at such number of points on the axle as to preclude disarrangement and also to insure desirable propelling connections between the armature and the truck-wheel without danger of injury on account of the strains and shocks caused by irregularities in the track or in the truck-wheels.

While it may be found generally most convenient to provide independent suspension means for the motor field-magnet frame, even in combination with my invention, such means may, if desired, be dispensed with and the field-magnet frame may be supported upon the bearings for the armature-quill.

I claim as my invention—

1. The combination with a truck-axle and a wheel having an annular series of chambers in one side and coil-springs in said chambers, of an electric motor, a sleeve or quill for the motor-armature having substantially radial arms each of which has rigidly-supported heads that project into adjacent wheel-chambers and have seats for the ends of the springs.

2. In a truck, the combination with a wheel having an annular series of chambers and coil-springs located therein, of an electric motor, a sleeve or quill for the motor-armature that loosely surrounds the wheel-axle and is provided with arms at one end the extremities of which have heads that project into the wheel-chambers to engage the ends of adjacent coil-springs and have flanges to prevent withdrawal from the chambers.

3. In a truck, the combination with a wheel provided with an annular set of chambers and helical springs therein having their axes disposed approximately at right angles to wheel radii, of an electric motor and a sleeve or quill for the motor-armature that loosely surrounds the wheel-axle and is provided with radial arms at one end, the extremities of which have rigidly-supported heads each of which engages the adjacent ends of two of the helical springs and has means to prevent withdrawal from the chamber.

4. In a truck, the combination with a wheel provided with an annular set of equally-spaced chambers and helical springs therein, of an electric motor and a sleeve or quill for the motor-armature that loosely surrounds the wheel-axle and is provided with a plurality of arms the outer end of each of which projects into two of said wheel-chambers to engage the adjacent ends of two of said springs and is provided with flanges to prevent withdrawal.

5. The combination with a truck-axle, a wheel having an annular set of chambers and helical springs seated in said chambers with their axes substantially perpendicular to the wheel radii, of an electric motor and a sleeve or quill for the motor-armature having substantially radial arms each of which has a head that projects into two adjacent chambers against the ends of the helical springs contained therein and is provided with flanges that prevent withdrawal from the chambers.

In testimony whereof I have hereunto subscribed my name this 31st day of March, 1905.

KARL F. ELERS.

Witnesses:
J. D. FARRER,
BIRNEY HINES.